US012606649B2

(12) United States Patent
Schaefer et al.

(10) Patent No.: US 12,606,649 B2
(45) Date of Patent: Apr. 21, 2026

(54) PROCESS FOR PREPARATION OF POLYISOBUTENE DERIVATIVES

(71) Applicant: BASF SE, Ludwigshafen am Rhein (DE)

(72) Inventors: Bernd Schaefer, Ludwigshafen (DE); Klaus Muehlbach, Gruenstadt (DE); Paul Lederhose, Ludwigshafen (DE); Wolfgang Grabarse, Ludwigshafen (DE); Andreas Minke, Ludwigshafen (DE); Thorsten Schoeppe, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 482 days.

(21) Appl. No.: 18/253,062

(22) PCT Filed: Nov. 9, 2021

(86) PCT No.: PCT/EP2021/081093

§ 371 (c)(1),
(2) Date: May 16, 2023

(87) PCT Pub. No.: WO2022/106263

PCT Pub. Date: May 27, 2022

(65) Prior Publication Data

US 2023/0406968 A1 Dec. 21, 2023

(30) Foreign Application Priority Data

Nov. 17, 2020 (EP) .................................... 20208053

(51) Int. Cl.
*C08F 8/06* (2006.01)
*C08F 110/14* (2006.01)
*C10L 1/195* (2006.01)
*C10M 143/18* (2006.01)

(52) U.S. Cl.
CPC .............. *C08F 8/06* (2013.01); *C08F 110/14* (2013.01); *C10L 1/195* (2013.01); *C10M 143/18* (2013.01)

(58) Field of Classification Search
CPC ................................ C08F 8/06; C08F 110/14
See application file for complete search history.

(56) References Cited

U.S. PATENT DOCUMENTS

| | | | |
|---|---|---|---|
| 3,484,353 | A | 12/1969 | Sharp |
| 4,152,499 | A | 5/1979 | Boerzel et al. |
| 4,925,579 | A | 5/1990 | Stemke |
| 5,408,018 | A | 4/1995 | Rath |
| 8,425,630 | B2 | 4/2013 | Waters et al. |
| 9,598,655 | B2 | 3/2017 | Shaikh et al. |

FOREIGN PATENT DOCUMENTS

| | | | |
|---|---|---|---|
| DE | 2702604 | A1 | 7/1978 |
| DE | 10055646 | A1 | 5/2002 |
| EP | 0145235 | A1 | 6/1985 |
| KR | 101748827 | B1 | 6/2017 |
| WO | WO-99/64482 | A1 | 12/1999 |
| WO | WO-2011/101281 | A1 | 8/2011 |

OTHER PUBLICATIONS

Adam, et al., "Photooxygenation of olefins in the presence of titanium (IV) catalyst. A convienient "one-pot" synthesis of epoxy alcohols", Journal of the American Chemical Society, vol. 111, Issue 1, Jan. 1, 1989, pp. 203-212.
Bilas, et al., "Untersuchungen über die Autoxidation verzweigter Olefine. I, Autoxidation von 2Methylalk1enen und 2Methyalk2enen", Journal für Praktische Chemie, vol. 324, Issue 1, 1982, pp. 125-141, with English abstract.
European Search Report for EP Patent Application No. 20208053.7, Issued on May 14, 2021, 3 pages.
International Search Report for PCT Patent Application No. PCT/EP2021/081093, Issued on Feb. 24, 2022, 3 pages.
Lehrle, et al., "Mass spectrometric methods for assessing the thermal stability of liquid polymers and oils: study of some liquid polyisobutylenes used in the production of crankcase oil additives", Journal of Analytical and Applied Pyrolysis, vol. 64, Issue 2, Sep. 2002, pp. 207-227.
Mayr, et al., "Living Oligomerization of Isobutylene Initiated by Cumyl Chloride/BCl3 Mixtures: Kinetic Analysis of the Initiation and the Early Propagation Steps", Macromolecules, vol. 30, Issue 14, Jul. 14, 1997, pp. 3965-3970.
Pazur, et al., "Thermoand photooxidation of polyisobutylene. I. Evolutions at temperatures above 50° C.", Journal of Polymer Science Part A: Polymer Chemistry, vol. 35, 1997, pp. 1689-1701.
International Preliminary Report on Patentability for PCT Patent Application No. PCT/EP2021/081093, Issued on Jun. 1, 2023, 7 pages.
Written Opinion for PCT Patent Application No. PCT/EP2021/081093, Issued on Feb. 24, 2022, 5 pages.

*Primary Examiner* — Wenwen Cai
(74) *Attorney, Agent, or Firm* — Grüneberg Global IP, PLLC

(57) ABSTRACT

The present application describes a new process for the preparation of polyisobutene derivatives, such polyisobutene derivatives, and their use. The process irradiates a reaction mixture containing an oxygen-containing gas in contact with polyisobutene, a photosensitizer and an optional solvent, with monochromatic light emitted from an electroluminescent lighting device, at least 90% of power of said monochromatic light and at most 100% of said power being emitted in the range from 350 nm to 680 nm.

17 Claims, No Drawings

PROCESS FOR PREPARATION OF POLYISOBUTENE DERIVATIVES

CROSS-REFERENCE TO RELATED APPLICATIONS

This application is the National Stage entry under § 371 of International Application No. PCT/EP2021/081093, filed on Nov. 9, 2021, and which claims the benefit of priority to European Application No. 20208053.7, filed on Nov. 17, 2020. The content of each of these applications is hereby incorporated by reference in its entirety.

The present application describes a new process for the preparation of polyisobutene derivatives, such polyisobutene derivatives, and their use.

Polyisobutene is known to improve the combustion efficiency of fuel burning devices, see e.g. U.S. Pat. No. 8,425,630 B2. The same is true for its derivatives, e.g. polyisobutene amines (PIBA) which is a common fuel additive in gasoline fuels as valve cleaning agent. The mechanism of the improvement of combustion efficiency is not known, it is postulated the under conditions of combustion the polyisobutene may be depolymerized so that isobutene or low molecular isobutene oligomers are released which act advantageously on combustion processes, see e.g. R. S. Lehrle, Journal of Analytical and Applied Pyrolysis, 64 (2002) 207-227.

It was an object of the present invention to provide derivatives of polyisobutenes which further to polyisobutene exhibit an additional effect in fuels.

It was found that the hydroperoxides of polyisobutene according to the present invention exhibit a lubricity which is not the case for polyisobutene.

Furthermore, a process for preparing such derivatives of polyisobutene is disclosed in which polyisobutene is photooxygenised.

Photooxygenation of olefins is known in the prior art:

KR 10 1748827 B1 (machine translation) discloses a synthesis of epoxides from olefins comprising photooxygenation in the presence of a sensitizer under irradiation in the presence of oxygen and epoxidation of the intermediate hydroperoxide with the help of a titanium catalyst.

An explicit example is disclosed using 2,3-dimethyl-2-butene, the scope of disclosure is limited to olefins substituted by a maximum of C12-alkyl groups.

W. Pritzkow et al. (Journal f. prakt. Chemie, vol. 324, no. 1, 1982, pages 123-141) describe the autoxidation of certain branched olefins, inter alia the dimeric isobutenes (2,4,4-trimethylpent-1-ene and 2,4,4-trimethylpent-2-ene).

The products of the autoxidation are predominantly epoxides, hydroperoxides are formed in a minor extent only.

The mechanism of the formation of epoxides is further elucidated in W. Adam et al., J. Am. Chem. Soc. 1989, 11, 203-212.

It is, however, well known that in the polymerization of isobutene dimeric isobutenes act as a chain transfer agent rather than a monomer (see e.g. U.S. Pat. No. 9,598,655 B2 or H. Mayr et al., Macromolecules 1997, 30, 3965-3970), therefore, the person skilled in the art could not transfer the results obtained with dimeric isobutenes to polyisobutene.

R. Pazur et al., J. Polym. Sci. Polym. Chem. Ed., 35, 9, 1689-1701, 1997, disclose the oxidative degradation of high molecular polyisobutene. The observations by R. Pazur et al. render obvi-ous an unselective oxidation together with a depolymerization of the polymer.

U.S. Pat. No. 3,484,353 disclose the photosensitized oxidation reactions of polymers with internal double bonds, especially copolymers prepared from diolefins. A reaction mechanism of the formation of hydroperoxides from internal double bonds from polymerised isoprene units is presented.

However, polyisobutene does not contain any or only few internal double bonds since to monomer mixture contains no or very little isoprene so that this reaction mechanism plays only a subordinate role in polyisobutene, if any.

It is further an object of the present invention to provide a process for manufacturing such derivatives of polyisobutene with a high selectivity and defined functionality without significant degradation of the starting material.

The object was achieved by derivatives of polyisobutene selected from the group consisting of 1a to 6a 1a

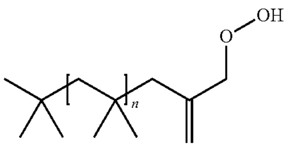

2a

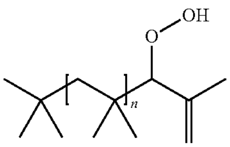

3a

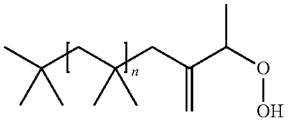

4a

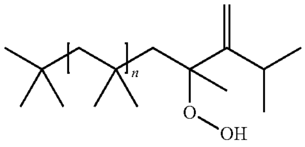

5a

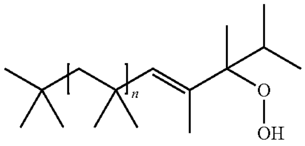

6a

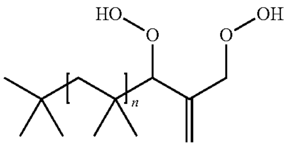

wherein n is a positive integer of at least 1, preferably at least 2, more preferably at least 3, even more preferably at least 5 and especially at least 8.

In a preferred embodiment the derivatives of polyisobutene according to the invention are highly polymeric with n being a positive integer of at least 8, preferably at least 9, more preferably at least 11, and most preferably at least 13.

The upper limit for the integer n is usually 100, preferably 85, more preferably 45 and most preferably 25.

The derivatives of polyisobutene are hydroperoxides of polyisobutene, these terms are used synonymously throughout the text.

Another object of the present invention are mixtures of such derivatives of polyisobutene, containing at least 5 wt %, preferably at least 7 wt %, more preferably at least 10 wt %, even more preferably at least 15 wt % and especially at least 20 wt % of such derivatives of polyisobutene, selected from one or more of the compounds of the general structure 1a to 6a.

In a preferred embodiment of the present invention such mixtures comprise polyisobutene further to the derivatives of polyisobutene selected from one or more of the compounds of the general structure 1a to 6a.

The content of polyisobutene in such mixtures according to the invention comprising polyisobutene and at least one derivative of polyisobutene selected from the compounds of the general structure 1a to 6a may be from 10 to 95 wt %, preferably 15 to 90, more preferably 20 to 85 and even more preferably 25 to 80 wt %, with the proviso that the amount of all constituents always add up to 100 wt %.

Furthermore, such mixtures may comprise one or more solvents (see below), usually in amounts to balance the mixture to 100 wt %.

Another object of the present invention is a process for the preparation of hydroperoxides of polyisobutenes comprising the steps of bringing an oxygen containing gas in contact with polyisobutene of the general formula 7 and/or 8 and/or 9 and/or 10 and/or 11 or their E-/Z-isomers or a solution of such polyisobutene in a suitable solvent

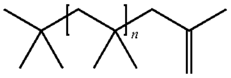

7

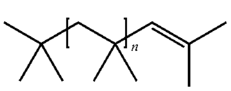

8

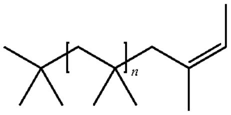

9

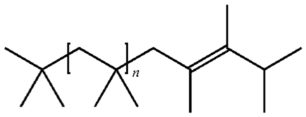

10

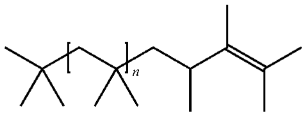

11 wherein n has the same meaning as defined above in the presence of a photosensitizer and irradiating the reaction mixture by means of an electroluminescent lighting device emitting monochromatic light, at least 90% of the power of said monochromatic light and at most 100% of said power being emitted in the range from 350 nm to 680 nm.

Compounds 7 to 11 shall also encompass their E-/Z-isomers, if any, with different configuration of the double bonds shown explicitly in the chemical structures given above.

Polyisobutene

The polyisobutene employed for the process according to the invention predominantly comprises one or more of the compounds of the general formula 7 and/or 8 and/or 9 and/or 10 and/or 11, preferably at least 50 wt %, more preferably at least 60 wt %, even more preferably at least 75 wt % and especially at least 85 wt % based on the sum of compounds of formula 7 and 8 and 9 and 10 and 11.

The polyisobutene employed in the process according to the present invention can be manufactured by any process known to the person skilled in the art as long as it contains compounds of the general formula 7 and/or 8 and/or 9 and/or 10 and/or 11 in amounts sufficient for the photooxygenation. Suitable processes for the preparation of polyisobutenes are e.g. disclosed in DE A 27 02 604, EP-A 145 235, U.S. Pat. No. 5,408,018, WO 99/64482, and WO 11/101281.

The polyisobutene is a homo- or copolymer of isobutene. Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 0.5 mol %, preferably more than 1 mol % and more preferably more than 2 mol % preferably up to a content of 10 mol %, more preferably up to 5 mol % of copolymerized monomers other than isobutene, preferably isoprene or linear butenes, preferably 1-butene, cis-2-butene, and trans-2-butene.

In a preferred embodiment isobutene copolymers are understood to mean polymers comprising not more than 0.5 mol % isoprene, preferably not more than 0.45 mol %, even more preferably not more than 0.4, and especially not more than 0.35 mol % isoprene and up to 10 mol %, more preferably up to 5 mol % linear butenes as copolymerized monomers, preferably 1-butene, cis-2-butene, and trans-2-butene.

In a preferred embodiment the polyisobutene is a high-reactive polyisobutene with a content of highly reactive double bonds per polyisobutene chain end of at least 70 mol %, preferably at least 75, very preferably at least 80 mol % and especially at least 90 mol %, based on the individual chain ends of the polyisobutene macromolecules. Highly reactive double bonds are those carbon-carbon double bonds in a-position (as in the general structure 7) or p-position of the chain end (as in the general structure 8).

In the context of the reaction according to the invention double bonds in a-position of the chain end are less reactive towards singlet oxygen than double bonds in p-position which are in turn less reactive than tetra-substituted double bonds.

The molecular weight of the polyisobutene employed is determined by the parameter n. As a polymer the polyisobutene is subject to a statistical distribution of chain lengths, usually they exhibit a polydispersity (PDI=Mw/Mn) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values are 1.2 to 1.7. For calculation of the polydispersity the number-average molecular weight Mn and the weight-average molecular weight Mw is determined by gel permeation chromatography.

Further to the compounds of the general formula 7 and/or 8 and/or 9 and/or 10 and/or 11 the polyisobutene employed may contain polyisobutene of other formulae, e.g.

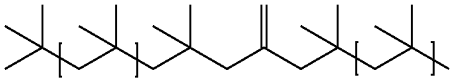

wherein the degree of polymerisation of such compounds, i.e. the number of isobutene monomers incorporated into the polymers, corresponds to that of the polyisobutene employed.

Solvent

The reaction may be carried out in the absence or preferably in the presence of at least one solvent in order to reduce the viscosity of the reaction medium.

As a solvent for the reaction benzene, $C_1$-$C_4$-alkylbenzene, 1,2-xylene, 1,3-xylene, 1,4-xylene, $C_4$-$C_{10}$-alkanes, $C_3$-$C_6$-alkanones, $C_1$-$C_{10}$-alkanols, such as 2-ethyl hexanol, dichloromethane, trichloromethane, tetrachloromethane, 1,1-dichloroethane, 1,2-dichloro-ethane, trichloroethane, 1-chlorobutane, tetrachloroethylene, carbondisulfide, $C_5$-$C_{12}$-cycloalkanes, $C_5$-$C_{12}$-cycloalkanones, acetonitrile, $C_6D_6$, $D_2O$, Freon 11, $C_6F_6$, tert. butyl methylether (MTBE), tert. butyl ethylether (ETBE) or mixtures thereof may be used.

It is also possible to use mixtures of hydrocarbons, such as Solvesso®.

In a preferred embodiment, solvents are used in which singlet oxygen has an extended half life-period.

It is preferred to add solvent in amount to the polyisobutene so that the reaction mixture may be easily conveyed through the reactor under the storage and reaction conditions.

Preferred solvents are those which can easily be separated from the reaction mixture after photooxygenation, e.g. by evaporation, stripping with an inert gas or distillation. Preferred solvents have a boiling point not higher than 200° C., preferably not higher than 150° C.

In one embodiment of the present invention the solvent may be left in the reaction mixture after reaction.

In another preferred embodiment the solvent is removed after reaction, for example by evaporation, stripping with an inert gas, distillation, rectification, membrane filtration, or reverse osmosis.

In this case the content of solvent in the mixture is for example not more than 10 wt %, preferably not more than 5 wt %, more preferably not more than 2 wt %, even more preferably not more than 1 wt % and especially not more than 0.5 wt %.

Photosensitizer

In order to conduct the reaction one or more photosensitizers are necessary in the reaction mixture to convert triplet oxygen to singlet oxygen necessary for photooxygenation.

Suitable photosensitizers are known to the person skilled in the art, preferably the photosensitizer is one or more selected from the group consisting of fluorescein, eosin, rose bengal, erythrosine, tetraphenylporphyrin, cobalt-tetraphenylporphyrin, zinc-tetraphenylporphyrin, hematoporphyrin, rhodamine B, basacryl brilliant red, methyl violet, methylene blue, fullerene C60, fullerene C70, graphene, carbon nanotubes, $Ru(bpy)_3^{2+}$, $Ru(phen)_3^{2+}$, cerco-sporin, and hypocrellin-A.

Preferred photosensitizers are rose bengal, tetraphenylporphyrin, methylene blue, and $Ru(bpy)_3^{2+}$.

Usually the photosensitizer is used in the reaction mixture in amounts of 1 to 1000 ppm by weight, preferably 2 to 750, and more preferably 5 to 500 ppm by weight.

After the reaction the photosensitizer may remain in the reaction mixture or it may be removed by absorbtion, e.g. to silica gel, aluminium oxide, zeolithes, diatomaceous earth, mixed aluminium silicium oxides, carbon black, charcoal, or by extraction with a solvent, preferably a polar solvent immiscible with the reaction mixture, e.g. water, methanol, ethanol, iso propanol or diethyl ether.

Oxygen-Containing Gas

An oxygen-containing gas is used for providing oxygen which is converted from triplet into singlet state under irradiation in the presence of at least one photosensitizer.

The oxygen-containing gas may be oxygen, air, oxygen/inert gas mixtures containing oxygen in a range of 1-99 vol %, preferably 2-90, more preferably 3 to 80, even more preferably 5 to 60 and most preferably 10 to 50 vol %.

Suitable inert gases may be nitrogen, noble gases, such as helium, neon, argon or krypton, carbon dioxide or exhaust gases, preferably nitrogen, argon or carbon dioxide, more preferably nitrogen.

Lighting Device

The electroluminescent lighting device for the reaction according to the invention emits monochromatic light.

Monochromatic light as understood within this disclosure is all radiation at least 90% of its power and at most 100% thereof being emitted to the reaction mixture in the range from 350 nm to 680 nm. For the sake of clarity, these figures refer to the radiation deposited within the reaction mixture. The power of a radiation source is not necessarily meaningful since the power encompasses radiation in the desired as well as undesired range of wavelengths, e.g. infrared radiation. Furthermore, the emission spectrum of a radiation source may be modified and attenuated by its passage through glass, e.g. of a photo reactor. The power of minor com-ponents of the monochromatic light being outside the given wavelength range at most amounts up to 10% depending on the filter-free electroluminescent lighting device employed, the nature and quantity of the photosensitizer and the organic solvent. However, the great majority of embodiments of monochromatic light only contains small amounts of light portions beyond 350 nm to 680 nm. In one embodiment monochromatic light is understood to be an entity, at least 95% of the power of said monochromatic light and at most 100% of said power being emitted in the range from 350 nm to 680 nm. In yet another embodiment monochromatic light means, at least 98% and further preferred at least 99% of the power of said monochromatic light and at most 100% of said power being emitted in the range from 350 nm to 680 nm. The amount of the monochromatic light is expressed in power since by doing so one is not urged to otherwise de-fine the permissible amount of light in lumen lm or candela cd above and below the claimed wavelength range. Said amount, when not expressed in power, would vary as a function of the wavelength considered. In yet a further specified embodiment, monochromatic light, as understood within this disclosure, is all radiation at least 90% of its power and at most 100% thereof being emitted in the range from 350 nm to 680 nm and its monomodal emission spectrum exhibiting a halfwidth of +/−10 to +/−30 nm in relation to the wavelength of the emission maximum. Said defined halfwidth gives a highly structured lighting signal, which results in an improved yield of the photooxygenation according to the present invention.

The wavelength of the monochromatic light has to be aligned with the absorption of the sensitizer used in order to gain an optimum quantum yield. In a preferred embodiment the wavelength of the monochromatic light corresponds to the absorption maximum of the sensitizer used, at least within the halfwidth of the spectrum.

In a preferred embodiment at least 50%, preferably at least 60%, more preferably at least 70%, and even more preferably at least 80% of the power of the radiation being emitted by the radiation source is in the wavelength range of the absorption maximum of the sensitizer used +/−100 nm, preferably +/−90 nm, even more preferably +/−80 nm, and especially +/−70 nm.

A filter-free electroluminescent lighting device within this disclosure is any electroluminescent device emitting light, which can be operated for a deliberately chosen time period merely by turning it off and on, and which does not comprise a filtering means. A filtering means can be a layer, a chemical compound or product applied onto the lighting device. A filtering means can also be a compound, which is immersed or solubilized in a solvent circulating, pumped or floating around the lighting device and adapted to absorb light in a distinct range. The electroluminescent lighting device is required not to operate by means of any kind of chemically induced lighting like gas ionization or by means of heating. The filter-free electroluminescent lighting device is understood to provide light (photons) emerging from electrons supplementing holes or gaps in an electron-poor material with emission of electromagnetic radiation preferably in the form of visible light. Said filter-free electroluminescent lighting device is selected from the group of light emitting electrochemical cells, electroluminescent wires, field-induced electroluminescent polymers, light emitting diodes, organic light emitting diodes, polymer light emitting diodes, active-matrix organic light-emitting diodes (AMOLED's), electroluminescent films especially based on inorganic luminescent materials, semiconductor lasers, diode lasers, chemical lasers, dye lasers, free-electron lasers, gas dynamic lasers, gas lasers, ion lasers, laser flashlights, metal-vapor lasers, monolinear optics quantum well lasers, ruby lasers, solid-state lasers. Preferably, said filter-free electroluminescent lighting device is selected from the group of light emitting electrochemical cells, electroluminescent wires, field-induced electroluminescent polymers, light emitting diodes, organic light emitting diodes, polymer light emitting diodes, active-matrix organic light-emitting diodes (AMOLED's), electroluminescent films especially based on inorganic luminescent materials.

In a preferred embodiment the electroluminescent lighting device consists of at least one light emitting diode (LED).

Reactor

The inventive process is preferably realized in a side-loop photoreactor, in a continuous flow-photoreactor or in a submersible photoreactor, more preferably in a continuous flow photoreactor.

A side loop photoreactor is a reactor introduced in a portion of a reaction circuit or attached to a portion of a reaction circuit. The reaction circuit is an apparatus or a mounting, through which the reaction mixture circulates. Side loop photoreactors can be easily attached or integrated into an existing reaction vessel or reaction plant. From this reaction vessel or reaction plant reaction mixture circulates during operation through the side-loop photoreactor. By doing so, only a portion of the reaction mixture is for a defined time in contact with radiation coming from the filter-free, electroluminescent lighting device (placed in the side-loop photoreactor). Said portion thereafter enters the reaction plant or reaction vessel and again travels through the side-loop photoreactor. By this intermittent contact of reaction mixture with radiation from said lighting device, the course of reaction is accelerated.

With a continuous flow photoreactor, the reaction mixture only once passes along the electroluminescent lighting device.

A submersible photoreactor is particularly useful, if one desires to work under vacuum, which is easier to realize, when the photoreactor completely immerses into the reaction mixture.

Reaction Conditions

The reaction mixture comprising polyisobutene, photosensitizer and optionally a solvent is placed into or circulated through the reactor, preferably under stirring or forced convection, and exposed to irradiation by the electroluminescent lighting device.

Simultaneously the reaction mixture is brought in contact with the oxygen-containing gas.

Preferably the oxygen-containing gas is bubbled through the reaction mixture with the bubbles dissipated e.g. by the use of a nozzle, a frit, stirring, static dissipators or static mixers in order to increase their surface and exchange of oxygen with the reaction mixture.

In a preferred embodiment no further stirring will be necessary since bubbling the oxygen-containing gas through the reaction mixture together with circulating the reaction mixture is sufficient mixing.

Hence, it is preferred to bubble a multiple of the volume of the reaction mixture per hour through the reaction mixture, preferably the 1- to 100-fold volume of the reaction mixture, preferably the 2- to 50-fold and more preferably the 5- to 20-fold volume per hour.

The reaction is carried out at a temperature ranging from −20° C. to +150° C., preferably from −10° C. to 100° C., more preferably from 0° C. to 80° C., very preferably from 5 to 50° C., and especially from 10 to 40° C.

It is a preferred embodiment to conduct the reaction according to the invention at a temperature of not more than 100° C., preferably not more than 80° C., more preferably not more than 60° C., and especially not more than 50° C. At these low temperatures the reaction can usually be stopped at the stage of a singly oxidated product, such as compounds 1a to 5a. The reaction rate for the formation of higher oxidated products is decreased so that the products formed in the reaction can be controlled. Higher reaction temperature may lead to the increased formation of more than singly oxidated products and depolymerization.

Furthermore, the formation of the hydroperoxyl-group takes place mainly in a-position to the reactive double bonds (i.e. at allylic hydrogen atoms). Methyl- and methylene-groups not in a-position to double bonds do not significantly undergo reaction under these reaction conditions.

The reaction can be conducted at atmospheric pressure, reduced or increased pressure up to 100 bar, preferably at atmospheric pressure up to 20 bar.

The reaction time of a batch reaction or residence time in a continuous reaction can range from several minutes to several hours, preferably 1 minute to 10 hours, more preferably 5 minutes to 5 hours and even more preferably 10 minutes to 1 hour.

Work Up

As pointed out above, after terminating the reaction the reaction mixture may be left as it is, i.e. solvent and photosensitizer may be left in the reaction mixture after reaction.

In another preferred embodiment the solvent is removed after reaction, for example by evaporation, stripping with an inert gas, distillation, rectification, membrane filtration, or reverse osmosis.

The photosensitizer may be removed by sorption, e.g. to silica gel, aluminium oxide, zeolithes, diatomaceous earth, mixed aluminium silicium oxides, carbon black, charcoal, or by extraction with a solvent, preferably a polar solvent immiscible with the reaction mixture, e.g. water, methanol, ethanol, iso propanol or diethyl ether.

Use

It has been found that the hydroperoxides according to the present invention, preferably mixtures thereof, exhibit an improved lubricating activity compared with the polyisobutene from which they are obtained. They exhibit this lubricating activity as solutions in the solvents mentioned above, preferably in hydrocarbon-containing solvents, more preferably in fuels, and especially in gasoline or diesel fuels. Therefore, it is a further object of the present invention to use the hydroperoxides according to the present invention for improving the lubricity of hydrocarbon mixtures or hydrocarbon-containing oils, more preferably in fuels or lubricants, and especially in gasoline or diesel fuels.

The hydroperoxides according to the present invention usually exhibit their lubricating effect in amounts of at least 750 ppm by weight based on the total amount of fuel, preferably at least 1000 ppm, more preferably at least 1500 ppm, even more preferably at least 2000, and especially at least 3000 ppm by weight.

The upper limit is determined by the viscosity of the resulting solution for the intended purpose of the fuel and usually does not exceed 50000 ppm by weight, preferably not more than 30000, more preferably not more than 20000, even more preferably not more than 15000, and especially not more than 10000 ppm by weight.

The hydroperoxides according to the present invention show their lubricating effect additionally to their effect on the combustion.

The examples which follow are intended to illustrate the present invention in detail without restricting it.

EXAMPLES

Example 1

A photochemical batch reactor, equipped with eighty-eight 405 nm LEDs is charged with 50 g highly reactive polyisobutene (Glissopal 1000 of BASF, Ludwigshafen, molecular weight approx. 1000 g/mol (a-double bonds in PIB: β-double bonds in PIB are in a ratio of ca. 9:1), 307 mg tetraphenylporphyrin and 492 g dichloromethane. Oxygen (5 l/h) is bubbled through the reaction mixture while it is irradiated at 20° C. After 12 h the reaction is terminated. After evaporation of the solvent the residue is analysed by NMR spectroscopy. The structure (1a) was assigned to the main product:

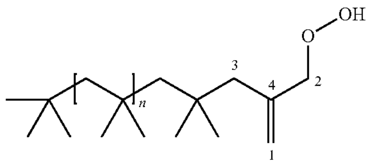

$^1$H-NMR (CDCl3): δ=5.04, 5.25 (C-1); 4.47 (C-2); 2.08 (C-3) ppm.

$^{13}$C-NMR (CDCl3): δ=118.21 (C-1), 81.38 (C-2), 141.94 (C-4) ppm.

Example 2

A photochemical batch reactor, equipped with eighty-eight 420 nm LEDs is charged with 201 g Glissopal 1000 (α-double bonds: β-double bonds=ca. 9:1), 123 mg tetraphenylporphyrin and 266 g dichloromethane. Oxygen (5 l/h) is bubbled through the reaction mixture while it is irradiated at 30° C. After 21 h the reaction is terminated. After evaporation of the solvent the residue is analysed by NMR spectroscopy. The structures of 1a (70.6 mol-%), 2a (6.3 mol-%), and 6a (15.6 mol-%) were assigned to the reaction products.

1a

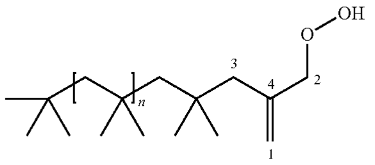

2a

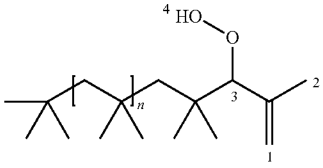

6a

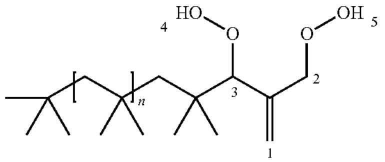

$^1$H-NMR (CDCl3) (1a): 5=5.04, 5.25 (C-1); 4.47 (C-2); 2.08 (C-3) ppm.

$^1$H-NMR (CDCl3) (2a): δ=5.01, 5.14 (C-1); 1.83 (C-2); 4.13 (C-3) ppm.

$^1$H-NMR (CDCl3) (6a): δ=5.47, 5.59 (C-1); 4.38 (C-2); 4.31 (C-3) ppm.

$^{13}$C-NMR (CDCl3) (1a): 8=113.8 (C-1), 80.7 (C-2), 47.9 (C-3), 139.4 (C-4) ppm.

$^{13}$C-NMR (CDCl3) (2a): 6=113.5 (C-1), 19.8 (C-2), 92.7 (C-3), 143.8 (C-4) ppm.

$^{13}$C-NMR (CDCl3) (6a): 8=115.4 (C-1), 78.0 (C-2), 89.4 (C-3), 139.5 (C-4) ppm.

Example 3

A 5 ml vial is charged with 1 millilitre of a solution of 0.89 g Indopol H100 17107 (a-double bonds: β-double bonds: tetra-substituted double bonds=ca. 10:61:25), 1 mg tetraphenylporphyrin, 40.8 mg dimethylterephthalate and 11.5 g trichloromethane. The vial is flushed with oxygen, capped an irradiated with a single 405 nm LED for 1.5 min at 15° C. After evaporation of the solvent the residue is analysed by NMR spectroscopy. Aside of starting material, the structures of (3a) and (4a) were assigned to the reaction products.

3a

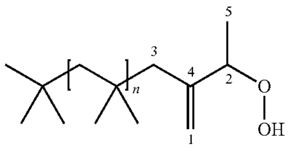

4a

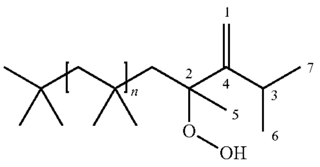

$^{1}$H-NMR (CDCl3) (3a): δ=5.00, 5.28 (C-1); 4.51 (C-2) ppm.

$^{1}$H-NMR (CDCl3) (4a): δ=5.03, 5.16 (C-1) ppm.

$^{13}$C-NMR (CDCl3) (3a): δ=113.9 (C-1), 84.2 (C-2), 48.9 (C-3), 147.2.4 (C-4), 18.4 (C-5) ppm.

$^{13}$C-NMR (CDCl3) (4a): δ=117.9 (C-1), 85.2 (C-2), 33.6 (C-3), 161.1 (C-4), 28.3 (C-5), 21.2 (C-6), 21.4 (C-7) ppm.

Example 4

A 5 ml vial is charged with 1 millilitre of a solution of 0.82 g polyisobutene (a-double bonds: β-double bonds: tetra-substituted double bonds=ca. 8:43:43), 1 mg tetraphenylporphyrin, 39.2 mg dimethylterephthalate and 10.6 g trichloromethane. The vial is flushed with oxygen, capped an irradiated with a single 405 nm LED for 1.5 min at 15° C. After evaporation of the solvent the residue is analysed by NMR spectroscopy. Aside of starting material and compound (4a) the structure of (5a) was assigned to one of the reaction products.

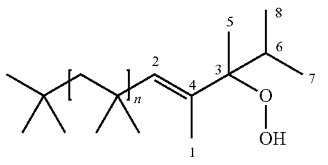

The quantity of 4a and 5a amounts to about 40% of polyisobutene subjected to the reaction.

$^{1}$H-NMR (CDCl3) (5a): δ=5.15 (C-2), 1.58 (C-5) ppm.

$^{13}$C-NMR (CDCl3) (5a): δ=135.5 (C-2), 89.3 (C-3), 161.1 (C-4), 13.2 (C-5) ppm.

Example 5

A photochemical batch reactor, equipped with one-hundred-eighty 525 nm LEDs is charged with 77.9 g Glissopal 1000 (a-double bonds: 58.6 mmol, β-double bonds=8.1 mmol), 20 mg tetraphenylporphyrin, 763 mg dimethylterephthalate (NMR standard) and 298 g trichloromethane. Oxygen (3 l/h) is bubbled through the reaction mixture while it is irradiated at −7° C. After 504 min the reaction is terminated. After evaporation of the solvent the residue is analysed by quantitative NMR spectroscopy. 43.4 mmol (1a), 4.6 mmol (2a) and 6.4 mmol (6a) were found in the reaction mixture.

Example 6

A photochemical batch reactor, equipped with one twenty-four 405 nm LEDs is charged with 5.11 g Glissopal 1000 (a-double bonds: 3.9 mmol, β-double bonds: 0.6 mmol), 7 mg tetraphenylporphyrin, 112 mg dimethylterephthalate (NMR standard) and 52 g trichloromethane. Air (0.5 l/h) is bubbled through the reaction mixture while it is irradiated at 15° C. After 252 min the reaction is terminated. After evaporation of the solvent the residue is analysed by quantitative NMR spectroscopy. 2.7 mmol (1a), 0.3 mmol (2a) and 0.5 mmol (6a) were found in the reaction mixture.

Example 7

A solution of 104.4 g Glissopal 1000 (a-double bonds: 79.2 mmol, β-double bonds: 10.3 mmol), 61 mg tetraphenylporphyrin, 2.5 g dimethylterephthalate (NMR standard) and 1350 g trichloromethane is reacted in the presence of 8 bar oxygen at 15° C. in a continuous photo flow reactor (G1 Photo Corning reactor: 10 LED panels: in total two hundred 405 nm LEDs, 5 G1 heart plates, volume: 8.2 ml/plate, flow rate: 4.1 ml/min, residence time: 10 min, single pass). After evaporation of the solvent the residue is analysed by quantitative NMR spectroscopy. 59.4 mmol a-PIB, 0.6 mmol p-PIB, 13.3 mmol (1a), 8.3 mmol (2a) and 0.3 mmol (6a) were found in the reaction mixture.

Example 8

A solution of 80.6 g Glissopal 1000 (a-double bonds: 62.5 mmol, β-double bonds: 7.5 mmol), 13 mg tetraphenylporphyrin, 1.0 g dimethylterephthalate (NMR standard) and 106 g dichloromethane is reacted in the presence of 5 bar oxygen at 15° C. in a side-loop continuous photo flow reactor (G1 Photo Corning reactor: 10 LED panels: in total two hundred 405 nm LEDs, 5 G1 heart plates, volume: 8.2 ml/plate, flow rate: 6.3 kg/h). The reaction was terminated after 935 min. After evaporation of the solvent the residue is analysed by quantitative NMR spectroscopy. 10.7 mmol a-PIB, 0 mmol p-PIB, 35.3 mmol (1a), 4.7 mmol (2a) and 2.6 mmol (6a) were found in the reaction mixture.

Example 9

A solution of 30.5 g polyisobutene (a-double bonds: 3.7 mmol, β-double bonds: 14.9 mmol), 15 mg tetraphenylporphyrin, 0.6 g dimethylterephthalate (NMR standard) and 266 g dichloromethane is reacted in the presence of 2 bar oxygen at 17° C. in a side-loop continuous photo flow reactor (G1 Photo Corning reactor: 10 LED panels: in total two hundred 405 nm LEDs, 5 G1 heart plates, volume: 8.2 ml/plate, flow rate: 5.6 kg/h). The reaction was terminated after 141 min. After evaporation of the solvent the residue is analysed by quantitative NMR spectroscopy. 3.1 mmol (1a), 9.9 mmol (2a) and 0 mmol (6a) were found in the reaction mixture.

Example 10

A photochemical batch reactor, equipped with one-hundred-eighty 525 nm LEDs is charged with 50.0 g Glissopal 1000 (a-double bonds: 40 mmol, p-double bonds: 7 mmol), 20 mg tetraphenylporphyrin, and 357.6 g trichloromethane. Oxygen (3 l/h) is bubbled through the reaction mixture while it is irradiated at −5° C. After 520 min the reaction is terminated. After evaporation of the solvent the residue is analysed by quantitative NMR spectroscopy. 30 mmol (1a) was found in the reaction mixture.

Example 11: Lubrification in Fuel

Description of the HFRR Test for Measurement of Wear and Friction

The High Frequency Reciprocating Rig (HFRR) procedure used according to ISO 12156 is the standard diesel fuel lubricity procedure.

In the example, the HFRR tests were carried out under the following conditions:

Time: 75 min, Temperature: 60° C., Stroke Length: 1 mm, Frequency: 50 Hz, Mass: 200 g, Volume 2 ml, Surface 600 $mm^2$ Additionally, the same operator and machine were used for all tests.

Examples of the action regarding the samples over base fuel

Given in the table are the mean results which were statistically fitted in order to overcome a drift in time.

Base fuel was a standard Diesel fuel without additives.

As an additive polyisobutene (Mw 1000 g/mol, Glissopal® 1000 by BASF SE, Ludwigshafen) and the reaction mixture of photooxygenation thereof according to Example 10 was used in the treat rate specified in Table 1.

| Additive | Amount [wt %] | Mean HFRR wear scar [μm] | Mean HFRR coefficient of friction |
|---|---|---|---|
| Hydroperoxide | 0.05% | 609 μm | 0.341 |
| Hydroperoxide | 0.50% | 453 μm | 0.217 |
| polyisobutene | 0.05% | 635 μm | 0.341 |
| polyisobutene | 0.50% | 588 μm | 0.333 |

The invention claimed is:

1. A derivative of polyisobutene, which is at least one derivative selected from the group consisting of 1a to 6a:

1a

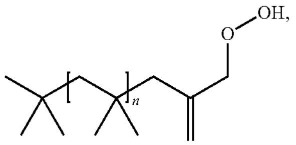

2a

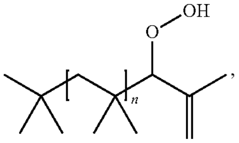

3a

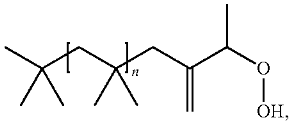

4a

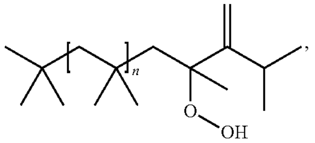

-continued

5a

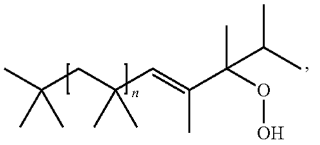

and

6a

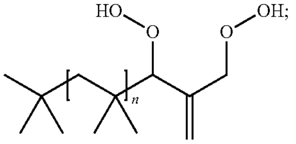

wherein n is a positive integer of at least 1.

2. The derivative of polyisobutene according to claim 1, wherein n is a positive integer of at least 8.

3. The derivative of polyisobutene according to claim 2, wherein n is a positive integer of at least 13.

4. A mixture comprising:

at least 5 wt % of the derivative of polyisobutene according to claim 1, polyisobutene, and optionally, at least one solvent.

5. A process for preparation of the derivative of polyisobutene of general structure 1a to 6a as defined in claim 1, the process comprising:

forming a reaction mixture comprising an oxygen-containing gas in contact with polyisobutene, a photosensitizer, and optionally a solvent for polyisobutene, wherein said polyisobutene is at least one of the general structure 7 and/or 8 and/or 9 and/or 10 and/or 11 or their E-/Z-isomers

7

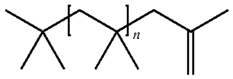

8

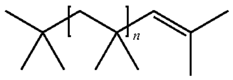

9

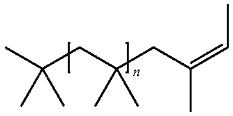

10

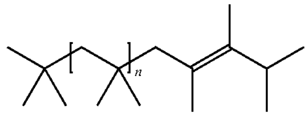

11

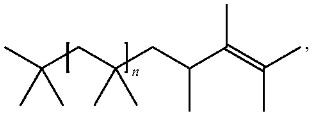

wherein n is a positive integer of at least 1, conducting a reaction by irradiating the reaction mixture with monochromatic light emitted from an electroluminescent lighting device, at least 90% of power of said monochromatic light and at most 100% of said power being emitted in the range from 350 nm to 680 nm.

6. The process according to claim 5, wherein the oxygen-containing gas is oxygen, air, or an oxygen/inert gas mixture containing oxygen in a range of 1-99 vol %.

7. The process according to claim 5, wherein the photosensitizer is at least one selected from the group consisting of fluorescein, eosin, rose bengal, erythrosine, tetraphenylporphyrin, cobalt-tetraphenylporphyrin, zinc-tetraphenylporphyrin, hematoporphyrin, rhodamine B, basacryl brilliant red, methyl violet, methylene blue, fullerene C60, fullerene C70, graphene, carbon nanotubes, $Ru(bpy)_3^{2+}$, $Ru(phen)_3^{2+}$, cercosporin, and hypocrellin-A.

8. The process according to claim 5, wherein the process is performed without solvent.

9. The process according to claim 5, wherein a solvent is present and is at least one solvent selected from the group consisting of benzene, $C_1$-$C_4$-alkylbenzene, 1,2-xylene, 1,3-xylene, 1,4-xylene, $C_4$-$C_{10}$-alkanes, $C_3$-$C_6$-alkanones, $C_1$-$C_{10}$-alkanols, dichloromethane, trichloromethane, tetrachloromethane, 1,1-dichloroethane, 1,2-dichloro-ethane, trichloroethane, 1-chlorobutane, tetrachloroethylene, carbondisulfide, $C_5$-$C_{12}$-cycloalkanes, $C_5$-$C_{12}$-cycloalkanones, acetonitrile, $C_6D_6$, $D_2O$, Freon 11, $C_6F_6$, tert-butyl methylether (MTBE), and tert-butyl ethylether (ETBE).

10. The process according to claim 5, wherein the electroluminescent lighting device comprises at least one light emitting diode (LED).

11. The process according to claim 5, wherein only a distinct portion of the reaction mixture is irradiated.

12. The process according to claim 5, wherein said reaction is carried out at a temperature ranging from −20° C. to +150° C.

13. The process according to claim 5, wherein said reaction is carried out at a pressure ranging from atmospheric pressure to 100 bar.

14. The process according to claim 5, wherein the reaction is performed in a side-loop photoreactor, in a continuous flow-photoreactor, or in a submersible photoreactor.

15. The process according to claim 5, wherein at least 50% of the power of the monochromatic light emitted by the electroluminescent lighting device is in the wavelength range of the absorption maximum of the photosensitizer+/−100 nm.

16. A method for improving the lubricity of a hydrocarbon mixture or a hydrocarbon-containing oil, comprising:

adding the derivative of polyisobutene according to claim 1, to a hydrocarbon mixture or a hydrocarbon-containing oil.

17. A mixture, comprising at least 5 wt. % of at least two of the derivative of polyisobutene according to claim 1.

* * * * *